(12) United States Patent
Satoh et al.

(10) Patent No.: US 9,453,991 B2
(45) Date of Patent: *Sep. 27, 2016

(54) WIDE-ANGLE LENS AND IMAGING DEVICE

(71) Applicant: RICOH COMPANY, LTD., Tokyo (JP)

(72) Inventors: Hiroyuki Satoh, Kanagawa (JP);
Noriyuki Terao, Miyagi (JP); Yoshiaki Irino, Kanagawa (JP); Tomonori Tanaka, Kanagawa (JP); Nozomi Imae, Kanagawa (JP); Toru Harada, Kanagawa (JP); Hirokazu Takenaka, Kanagawa (JP); Hideaki Yamamoto, Kanagawa (JP); Kensuke Masuda, Kanagawa (JP); Satoshi Sawaguchi, Kanagawa (JP); Daisuke Bessho, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,056

(22) Filed: Mar. 18, 2015

(65) Prior Publication Data

US 2015/0192762 A1    Jul. 9, 2015

Related U.S. Application Data

(63) Continuation of application No. 14/233,347, filed as application No. PCT/JP2012/069267 on Jul. 23, 2012, now Pat. No. 9,019,342.

(30) Foreign Application Priority Data

Jul. 25, 2011  (JP) ................................. 2011-162213

(51) Int. Cl.
*G02B 13/06* (2006.01)
*G02B 19/00* (2006.01)
(Continued)

(52) U.S. Cl.
CPC ........... *G02B 13/06* (2013.01); *G02B 13/0065* (2013.01); *G02B 19/008* (2013.01); *G02B 27/1066* (2013.01); *H04N 5/23238* (2013.01)

(58) Field of Classification Search
CPC ....................................................... G02B 13/06
See application file for complete search history.

(56) References Cited

U.S. PATENT DOCUMENTS 4,566,763 A    1/1986  Greguss
5,434,713 A    7/1995  Sato
(Continued)

FOREIGN PATENT DOCUMENTS

EP    1 630 584 A1    3/2006
JP    2-59735          2/1990
(Continued)

OTHER PUBLICATIONS

"Fisheye projection lens for large format film" by Rekha Doshi, Hughes Leitz Optical Technologies, SPIE vol. 2000, pp. 53- 61.*
(Continued)

*Primary Examiner* — James Pontius
(74) *Attorney, Agent, or Firm* — Oblon, McClelland, Maier & Neustadt, L.L.P (57) ABSTRACT

A wide-angle lens having a field angle larger than 180 degrees includes, in order from an object side to an image side, a front group, a reflection surface, and a back group, wherein the front group includes three lenses having a negative refractive power, the reflection surface is configured to curve an optical axis of the front group at 90 degrees toward the back group, the back group includes four lenses having a positive refractive power, a front principle point is set between a second lens and a third lens from the object side in the front group, and a focal length of an entire system f and a distance between an intersection of the reflection surface and the optical axis of the front group and the front principle point d satisfy the following condition (1).

$7.0 < d/f < 9.0$    (1)

13 Claims, 6 Drawing Sheets

(51) Int. Cl.
    *G02B 27/10*     (2006.01)
    *G02B 13/00*     (2006.01)
    *H04N 5/232*     (2006.01)

(56) References Cited

U.S. PATENT DOCUMENTS

| | | | |
|---|---|---|---|
| 5,990,941 A | 11/1999 | Jackson et al. | |
| 6,144,503 A | 11/2000 | Sugano | |
| 6,304,285 B1 | 10/2001 | Geng | |
| 6,313,865 B1 | 11/2001 | Driscoll et al. | |
| 6,480,229 B1 | 11/2002 | Driscoll et al. | |
| 6,611,282 B1 | 8/2003 | Trubko et al. | |
| 6,795,113 B1 | 9/2004 | Jackson et al. | |
| 6,967,782 B2 | 11/2005 | Mihara | |
| 7,023,628 B1 * | 4/2006 | Ning | G02B 13/06 359/680 |
| 7,170,690 B2 | 1/2007 | Ophey | |
| 7,180,684 B1 | 2/2007 | Ori | |
| 7,508,597 B2 | 3/2009 | Liao | |
| 7,675,694 B2 * | 3/2010 | Kim | G02B 13/0045 359/793 |
| 7,929,221 B2 * | 4/2011 | Ning | G02B 9/60 359/713 |
| 8,503,109 B2 | 8/2013 | Kimura et al. | |
| 2006/0056048 A1 * | 3/2006 | Sato | G02B 13/0065 359/684 |
| 2006/0061871 A1 | 3/2006 | Ophey | |
| 2007/0024987 A1 | 2/2007 | Ori | |
| 2007/0064143 A1 * | 3/2007 | Soler | G02B 13/06 348/335 |
| 2007/0139793 A1 | 6/2007 | Kawada | |
| 2007/0183058 A1 | 8/2007 | Bito et al. | |
| 2007/0268598 A1 | 11/2007 | Kang et al. | |
| 2008/0247053 A1 | 10/2008 | Iwasawa | |
| 2008/0278826 A1 | 11/2008 | Wakamiya | |
| 2009/0080093 A1 * | 3/2009 | Ning | G02B 13/06 359/753 |
| 2009/0082629 A1 | 3/2009 | Dotan et al. | |
| 2010/0254025 A1 | 10/2010 | Yoshida et al. | |
| 2011/0317989 A1 | 12/2011 | Murakami et al. | |
| 2012/0056978 A1 | 3/2012 | Abe et al. | |
| 2013/0050408 A1 | 2/2013 | Masuda et al. | |
| 2014/0132709 A1 | 5/2014 | Satoh et al. | |
| 2015/0192762 A1 | 7/2015 | Satoh et al. | |

FOREIGN PATENT DOCUMENTS

| | | |
|---|---|---|
| JP | 5-273459 | 10/1993 |
| JP | 3290993 | 6/2002 |
| JP | 2007-155977 | 6/2007 |
| JP | 2007-164079 | 6/2007 |
| JP | 2007-310366 | 11/2007 |
| JP | 2008-083316 | 4/2008 |
| JP | 2010-020086 | 1/2010 |
| JP | 2010-243711 | 10/2010 |
| JP | 2010-256627 | 11/2010 |
| JP | 2011-107425 | 6/2011 |
| JP | 2013-25255 | 2/2013 |
| KR | 10-0934719 | 12/2009 |
| WO | WO 0168540 | 9/2001 |
| WO | WO 03046632 | 6/2003 |
| WO | WO 2010/077050 A2 | 7/2010 |
| WO | WO 2010/122882 | 10/2010 |

OTHER PUBLICATIONS

Combined Chinese Office Action and Search Report issued Dec. 1, 2014 in Patent Application No. 201280036931.6 (with English language translation).

International Search Report issued on Oct. 23, 2012 in PCT/JP2012/069267 filed on Jul. 23, 2012.

Russian Notice of Decision to Grant dated Feb. 25, 2015 for Russian Application No. 2014106828 (with English translation thereof).

Japanese Office Action mailed Aug. 4, 2015 for Japanese Application No. 2014-234599.

Extended European Search Report dated Dec. 15, 2015 for European Patent Application No. 15183735.8.

"Fisheye projection lens for large format film" by Rekha Doshi, Hughes Leitz Optical Technologies, SPIE vol. 2000, pp. 53-61.

* cited by examiner

WIDE-ANGLE LENS AND IMAGING DEVICE

CROSS REFERENCE TO RELATED APPLICATION

The present application is a continuation of U.S. application Ser. No. 14/233,347, filed Jan. 16, 2014, which is National Stage Application of PCT/JP12/069267, filed Jul. 23, 2012, and which is based on and claims priority from Japanese Patent Application No. 2011-162213, filed on, Jul. 25, 2011. The disclosures of each of the above are hereby incorporated by reference in their entirety.

TECHNICAL FIELD

The present invention relates to a wide-angle lens for use in an imaging device and an imaging device.

BACKGROUND ART

An imaging device in which two imaging optical systems each including a wide-angle lens having a field angle wider than 180 degrees and an imaging sensor for imaging an image by the wide-angle lens are combined such that the respective object side lenses are opposed to each other, and the images by the respective imaging optical systems are synthesized to obtain an image in a solid angle of $4\pi$ radian is known (refer to Japanese Patent Publication No. 3290993).

Such an imaging device can simultaneously obtain image information in all directions; thus, it can be effectively used for a security monitoring camera or a car-mounted camera, for example. In recent years, it is required to downsize such an imaging device to be used as a portable imaging device.

Extremely accurate and fair image information can be obtained by using a small imaging device in a hand-held condition in report of news, for example.

It is preferable to deflect the light of the maximum image height away from the optical axis in the wide-angle lens having a field angle of 180 degrees or more for use in such an imaging device without using a sharp angle to be imaged on an imaging surface.

However, if the entire length of the wide-angle lens having a field angle of 180 degrees or more is reduced, it becomes necessary to drastically deflect the light beam in the periphery away from the optical axis. For this reason, a resolution in the peripheral portion of the imaging surface is reduced due to various aberrations.

It is necessary to gently deflect the light beam in the periphery for maintaining a high resolution in the periphery of the imaging surface. For this reason, the entire length of the lens is increased, and such an imaging device is not suitable for use in a hand-held condition.

Japanese Patent Publication No. 3290993 does not specifically describe a wide-angle lens.

Various wide-angle lenses having a wide field angle and a good performance have been conventionally proposed. Among them, the wide-angle lenses described in Japanese Patent Application Publication Nos. 2007-155977 and 2010-256627 specially have a good performance.

However, it is difficult to reduce the entire length of the wide-angle lens described in Japanese Patent Application Publication Nos. 2007-155977 and 2010-256627. If such wide-angle lenses are used as two wide-angle lenses for use in an imaging device, the size of the device is increased.

When using two wide-angle lenses as described in Japanese Patent Application Publication Nos. 2007-155977 and 2010-256627, it is difficult to reduce the distance between the optical axes of the two wide-angle lenses, and the overlapped portions of the images in the peripheral portions of the respective wide-angle lenses are misaligned to each other due to disparity. Thus, deterioration in an image is likely to remarkably develop in the jointed portion of the synthetic image.

SUMMARY OF THE INVENTION

The present invention has been made in view of the above circumferences. An object of the present invention is to provide a wide-angle lens for use in an imaging device, which can obtain a synthetic image having less disparity and can ensure an optical performance.

An object of the present invention is also to provide a small imaging device using the above two wide-angle lenses.

In order to achieve the above object, one embodiment of the present invention provides a wide-angle lens having a field angle larger than 180 degrees, including: in order from an object side to an image side, a front group; a reflection surface; and a back group, wherein the front group includes three lenses having a negative refractive power, the reflection surface is configured to curve an optical axis of the front group at 90 degrees toward the back group, the back group includes four lenses having a positive refractive power, a front principle point is set between a second lens and a third lens from the object side in the front group, and a focal length of an entire system f and a distance between an intersection of the reflection surface and the optical axis of the front group and the front principle point d satisfy the following condition (1).

$$7.0 < d/f < 9.0 \tag{1}$$

Preferably, a distance from a most object side surface of the front group to the reflection surface DA and a distance from the reflection surface to a most image side surface of the back group DB satisfy the following condition (2).

$$DA < DB \tag{2}$$

Preferably, the reflection surface arranged between the front group and the back group is an inclined surface of a right angle prism, and is configured to internal-reflect a light beam from the front group toward the back group, and a reflective index relative to d-line of a material of the right angle prism nd satisfies the following condition (3).

$$nd \geq 1.8 \tag{3}$$

Preferably, the front group includes, in order from the object side, a negative meniscus lens, a negative lens made of a plastic material and a negative meniscus lens, the back group includes, in order from the object side, a biconvex lens, a cemented lens of a biconvex lens and a biconcave lens and a biconvex lens made of a plastic material, an aperture stop is arranged between the right angle prism and the back group, the negative lens made of the plastic material in the front group and the biconvex lens made of the plastic material in the back group have aspheric surfaces on both surfaces, and the other lenses except the lenses made of the plastic material are spherical lenses, respectively.

In order to achieve the above object, one embodiment of the present invention also provides an imaging device comprising two imaging optical systems including a wide-angle lens having a field angle wider than 180 degrees and an imaging sensor which images an image by the wide-angle lens, the two imaging optical systems being combined such that object side lenses are opposed to each other, and the images by the respective imaging optical systems being synthesized to obtain an image in a solid angle of 4π radian, wherein the wide-angle lens for use in each of the two imaging optical systems is the wide-angle lens according to any one of Claims 1-4, and a distance between an intersection of the reflection surface and the optical axis of the front group and a front principle point in the wide-angle lens of one imaging optical system d1, a distance between an intersection of the reflection surface and the optical axis of the front group and the front principle point in the wide-angle lens of the other imaging optical system d2 and a focal length of the wide-angle lens of each imaging optical system f satisfy the following condition (4).

$$16 \leq (d1+d2)/f < 21 \quad (4)$$

Preferably, the wide-angle lenses for use in the two imaging optical systems are d1=d2.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DESCRIPTION OF EMBODIMENT

Hereinafter, an embodiment will be described.

Figure 1:
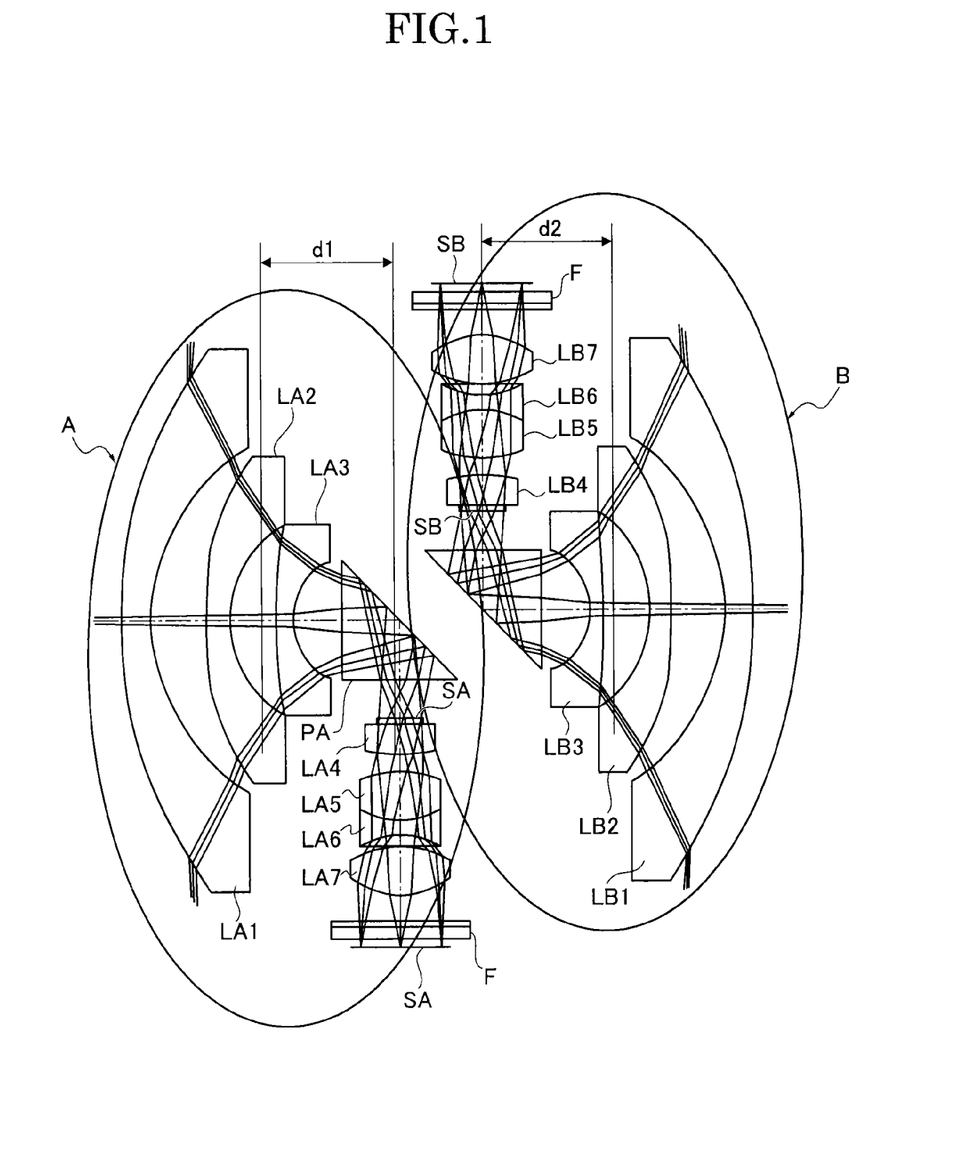
FIG. 1 is a view describing an optical arrangement of an imaging device according to an embodiment.

FIG. 1 is a view illustrating a main portion of an imaging device.

In FIG. 1, reference numbers A, B denote imaging optical systems, respectively.

Each of the two imaging optical systems A, B includes a wide-angle lens having a field angle wider than 180 degrees and an imaging sensor which images an image by the wide-angle lens.

The imaging optical system A includes a front group having lenses LA1-LA3, a right angle prism PA constituting a reflection surface and a back group having lenses LA4-LA7. An aperture stop SA is arranged on the object side of the lens LA4.

The imaging optical system B includes a front group having lenses LB1-LB3, a right angle prism PB constituting a reflection surface and a back group having lenses LB4-LB7. An aperture stop SB is arranged on the object side of the lens LB4.

The lenses LA1-LA3 constituting the front group of the imaging optical system A are in order from the object side a negative meniscus lens (LA1) made of a glass material, a negative lens (LA2) made of a plastic material and a negative meniscus lens (LA3) made of a glass material.

The lenses LA4-LA7 constituting the back group are in order from the object side a biconvex lens (LA4) made of a glass material, a cemented lens of a biconvex lens (LA5) and a biconcave lens (LA 6) made of a glass material, and a biconvex lens (LA7) made of a plastic material.

The lenses LB1-LB3 constituting the front group of the imaging optical system B are in order from the object side a negative meniscus lens (LB1) made of a glass material, a negative lens (LB2) made of a plastic material and a negative meniscus lens (LB3) made of a glass material.

The lenses LB4-LB7 constituting the back group are in order from the object side a biconvex lens (LB4) made of a glass material, a cemented lens of a biconvex lens (LB5) and a biconcave lens (LB6) made of a glass material and a biconvex lens (LB7) made of a plastic material.

In these imaging optical systems A, B, the negative lenses LA2, LB2 of the front group made of a plastic material and the biconvex lenses LA7, LB7 of the back group made of a plastic material have an aspheric surface on their both surfaces. The other lenses made of a glass material are spherical lenses, respectively.

The front principal point in each wide-angle lens is set between the second lens LA2, LB2 and the third lens LA3, LB3.

The distance between the intersection of the reflection surface and the optical axis of the front group and the front principle point is d1 in FIG. 1 in the wide-angle lens of the imaging optical system A and the distance between the intersection of the reflection surface and the optical axis of the front group and the front principle point is d2 in the wide-angle lens of the imaging optical system B.

These distances d1, d2 are a distance d in the wide-angle lens, and the condition (1) 7.0<d/f<9.0 is satisfied.

The decrease in the parameter d/f of the condition (1) means the increase in the focal length of the entire system f or the decease in the distance between the intersection of the reflection surface and the optical axis of the front group and the front principle point d.

If the focal length f is increased, the entire length of the wide-angle lens on the optical axis is increased. Therefore, if the focal length is set to an appropriate value in view of downsizing, the distance d is reduced in that condition.

Upon the decrease in d, the interval between the lens LA3 (LB3) and the prism PA (PB) is narrowed, so that the limit relative to the thickness of the lens LA3 (LB3) for ensuring a required refractive power becomes strict. If the lower limit value of the condition (1) is lowered, a desired thickness and shape of the lens LA3 (LB3) can not be obtained, and it becomes difficult to process the lens LA3 (LB3).

It is preferable for the imaging optical systems A, B in FIG. 1 to be close to each other as much as possible in the right and left direction in FIG. 1, in order to downsize the imaging device. Since the reflection surfaces are inclined surfaces of the right angle prism PA, PB, it is effective for the inclined surfaces to be close to each other as much as possible for downsizing.

The increase in the parameter d/f of the condition (1) means the increase in the distance d between the intersection of the reflection surface and the optical axis of the front group and the front principle point. This means the increase in the size of the front group.

Such an increase in the size of the front group makes it difficult to downsize the imaging device. In this case, as a method of preventing the increase in the size of the imaging device due to the increase in the front group, the imaging optical systems A, B are arranged to be displaced in the up and down direction in FIG. 1 in a state in which the inclined surfaces of the prisms PA, PB are arranged to be close to each other.

However, with this constitution, the optical axes of the front groups of the wide-angle lenses of the imaging optical systems are misaligned in the up and down direction in FIG.

1, so that the effect of the above disparity is increased if such misalignment goes beyond a certain level.

If the parameter d/f is smaller than the upper limit of the condition (1), the increase in the size of the front group can be maintained within an allowable range while effectively controlling the effect of the disparity.

The condition (4) 16≤(d1+d2)/f<21 is to control the condition relative to d/f of the ratio of the distance d and the focal length f regarding the imaging device. If the parameter exceeds the lower limit of the condition (4) while controlling the effect of the disparity, the reflection surfaces of the prisms PA, PB interfere to each other. If the parameter exceeds the upper limit, the effect of the disparity can not be ignored.

The condition (3) nd≥1.8 defines that a material in which the refractive index relative to d-line nd is larger than 1.8 is used as a material of the prisms PA, PB.

The prisms PA, PB internal-reflect the light from the front group toward the back group, so that the light path of the imaging light beam passes in the prism. If the material of the prism has a high refractive index which satisfies the condition (3), the light path length in the prism becomes longer than an actual light path length, and the distance which curves the light beam can be increased.

The light path length between the front group and back group in the front group, prism and back group can be increased longer than a mechanical light path length; thus, the wide-angle lens can be downsized.

By arranging the prisms PA, PB near the aperture stops SA, SB, a small prism can be used, and the distance between the wide-angle lenses can be reduced.

The prisms PA, PB are arranged between the front group and the back group. The front group of the wide-angle lens has a role which obtains a light beam having a field angle wider than 180 degrees, and the back group effectively operates for the imaging of the aberration correction.

The effects of the manufacturing tolerance and the arrangement error of the prism can be avoided with the arrangement of the prisms as described above.

As described above, the wide-field angle includes the reflection surface between the front group and the back group, and the front group and the back group are configured to from a right angle. With this constitution, the entire length required for maintaining a high performance wide-angle lens is ensured.

When using the two wide-angle lenses for an imaging device, the reflection surface portions are arranged to be close to each other in the direction orthogonal to the optical axis of the front group, and the effect of disparity can be effectively reduced.

Moreover, since the front principle point is set between the second lens and the third lens in the front group, the size of the reflection surface can be effectively reduced.

Accordingly, by using the two wide-angle lenses for an imaging device, a preferable imaging device having an effectively reduced disparity can be obtained.

Example

A specific example of the wide-angle lens will be hereinbelow described.

This example illustrates a wide-angle lens for use in the imaging optical systems A, B of the imaging device illustrated in FIG. 1. Namely, the two wide-angle lenses for use in the imaging optical systems A, B are the same, d1=d2.

In the following example, f denotes a focal length of an entire system, No denotes an F-number and ω denotes a half-field angle.

The surface numbers are 1-23 in order from the object side. These numbers denote a lens surface, incident and emission surfaces and a reflection surface of a prism, an aperture stop surface, a filter surface and a light-receiving surface of an imaging sensor.

R denotes a curvature radius of each surface, and denotes a paraxial curvature radius in an aspheric surface.

D denotes a surface interval, nd denotes a refractive index of d-line, and νd denotes an Abbe's number. An object distance is infinity. A unit of length is mm.

Example

| f = 0.75, No = 2.14, ω = 190 DEGREES | | | | |
|---|---|---|---|---|
| SURFACE NUMBER | R | D | Nd | νd |
| 1 | 17.1 | 1.2 | 1.834807 | 42.725324 |
| 2 | 7.4 | 2.27 | | |
| 3 | −1809 | 0.8 | 1.531131 | 55.753858 |
| 4* | 4.58 | 2 | | |
| 5* | 17.1 | 0.7 | 1.639999 | 60.078127 |
| 6 | 2.5 | 1.6 | | |
| 7 | ∞ | 0.3 | | |
| 8 | ∞ | 5 | 1.834000 | 37.160487 |
| 9 | ∞ | 1.92 | | |
| 10 | ∞ (APERTURE STOP) | 0.15 | | |
| 11 | 93.2 | 1.06 | 1.922860 | 18.896912 |
| 12 | −6.56 | 1.0 | | |
| 13 | 3.37 | 1.86 | 1.754998 | 52.321434 |
| 14 | −3 | 0.7 | 1.922860 | 18.896912 |
| 15 | 3 | 0.3 | | |
| 16* | 2.7 | 1.97 | 1.531131 | 55.753858 |
| 17* | −2.19 | 0.8 | | |
| 18 | ∞ | 0.4 | 1.516330 | 64.142022 |
| 19 | ∞ | 0 | | |
| 20 | ∞ | 0.3 | 1.516330 | 64.142022 |
| 21 | ∞ | 0.3 | | |
| 22 | IMAGING SURFACE | | | |

Surfaces having * (both surfaces of second lens in front group and both surfaces of final lens in back group) in the above data are aspheric surfaces.

An aspheric surface shape is defined by the following known equation by using an inverse of a paraxial curvature radius (paraxial curvature) C, a height from an optical axis H, a conical constant K, and an aspheric coefficient of each order with X as the aspheric surface amount in the optical axis direction.

$$X = CH^2/[1+\sqrt{[1-(1+K)C^2H^2]}] + A4 \cdot H^4 + A6 \cdot H^6 + A8 \cdot H^8 + A10 \cdot H^{10} + A12 \cdot H^{12} + A14 \cdot H^{14}$$

The shape is specified by applying a paraxial curvature radius, a conical constant and aspheric surface coefficient.

Aspheric surface data of the above example is as follows.
Third Surface
 4th: 0.001612
 6th: −5.66534e-6
 8th: −1.99066e-7
 10th: 3.69959e-10
 12th: 6.47915e-12
Fourth Surface
 4th: −0.00211
 6th: 1.66793e-4
 8th: 9.34249e-6
 10th: −4.44101e-7
 12th: −2.96463e-10
Sixteenth Surface
 4th: −0.006934
 6th: −1.10559e-3

8th: 5.33603e-4
10th: −1.09372e-4
12th: 1.80753-5
14th: −1.52252e-7
Seventeenth Surface
   4th: 0.041954
   6th: −2.99841e-3
   8th: −4.27219e-4
   10th: 3.426519e-4
   12th: −7.19338e-6
   14th: −1.69417e-7

In the above aspheric surfaces, for example, −1.69417e-7 means −1.69417×10$^{-7}$. In addition, 4$^{th}$-14$^{th}$ are A4-A14, respectively, The parameter values of respective conditions are as follows.

The parameter value of the condition (1)

$$d=d1=d2=6$$

$$f=0.75$$

$$d/f=8$$

The parameter value of condition (2)

$$DA=8.87$$

$$DB=14.76$$

The parameter value of condition (3)

$$nd=1.834000$$

The parameter value of condition (4)

$$(d1+d2)/f=16$$

Accordingly, the wide-angle lens and the imaging device of this example satisfy the conditions (1)-(4).

The interval between optical axes (interval between front principle points in up and down direction in FIG. 1) can be reduced 14 mm compared to a wide-angle lens using parallel light paths without being curved.

As described above, the light path lengths of the light beams passing through the periphery and the center of the wide-angle lens having a filed angle of 180 degrees or more are changed according to the thickness difference of the lens, causing deterioration in a performance. Among the three lenses of the front group in the wide-angle lens in this example, the second lens often has a thickness difference between the portion near the optical axis and the periphery of the lens. For this reason, aspheric surfaces are applied to both surfaces of the second lens as a plastic lens so as to correct the second lens.

Moreover, by using the aspheric surfaces on both surfaces of the final lens of the back group as a plastic lens, the aberrations generated on the object side of this lens are preferably corrected.

Among the four lenses of the back group, the chromatic aberration is preferably corrected by cementing the second biconvex lens and the third biconcave lens.

Figure 2:
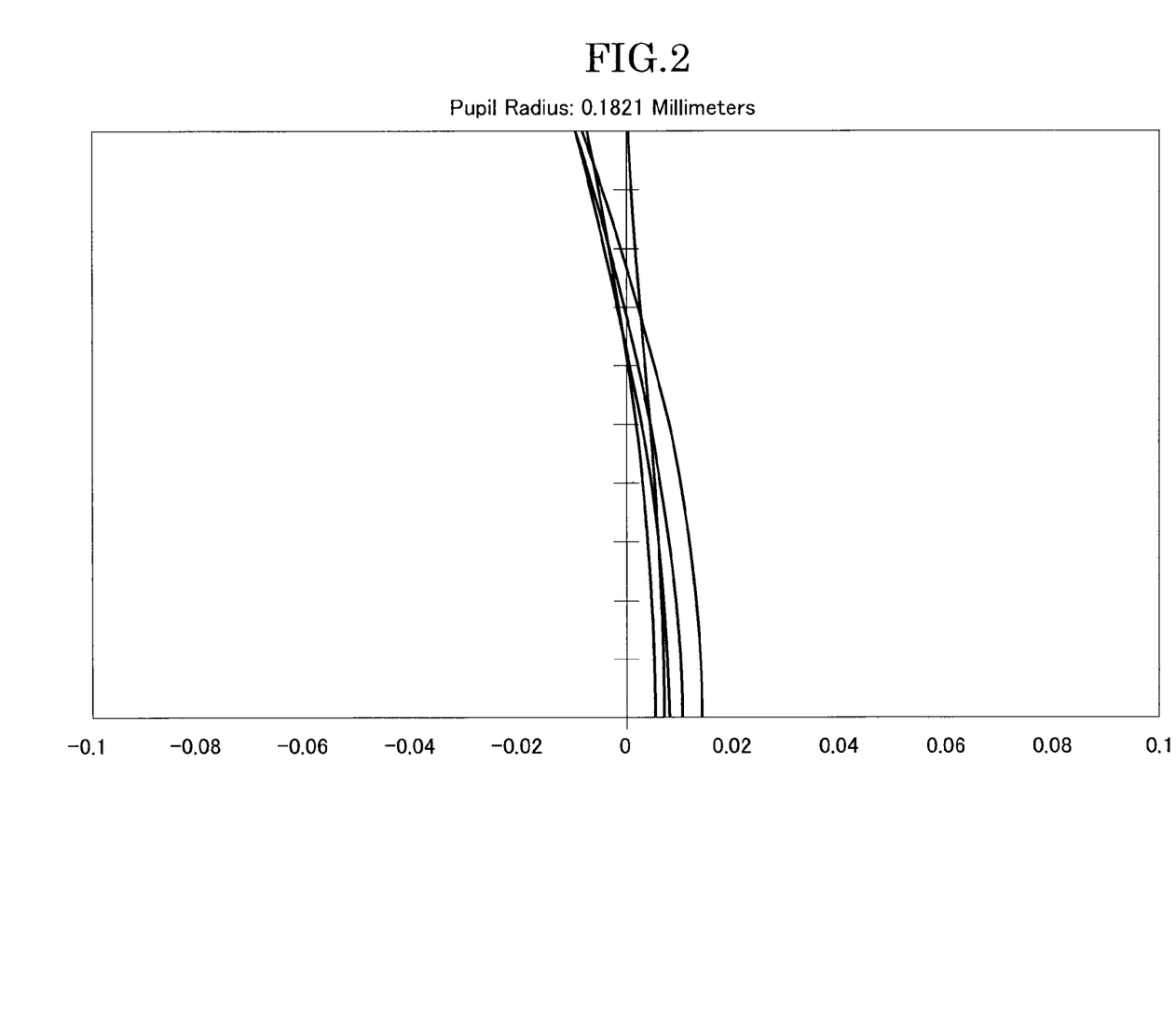
FIG. 2 is a view illustrating spherical aberration of Example.
Figure 3:
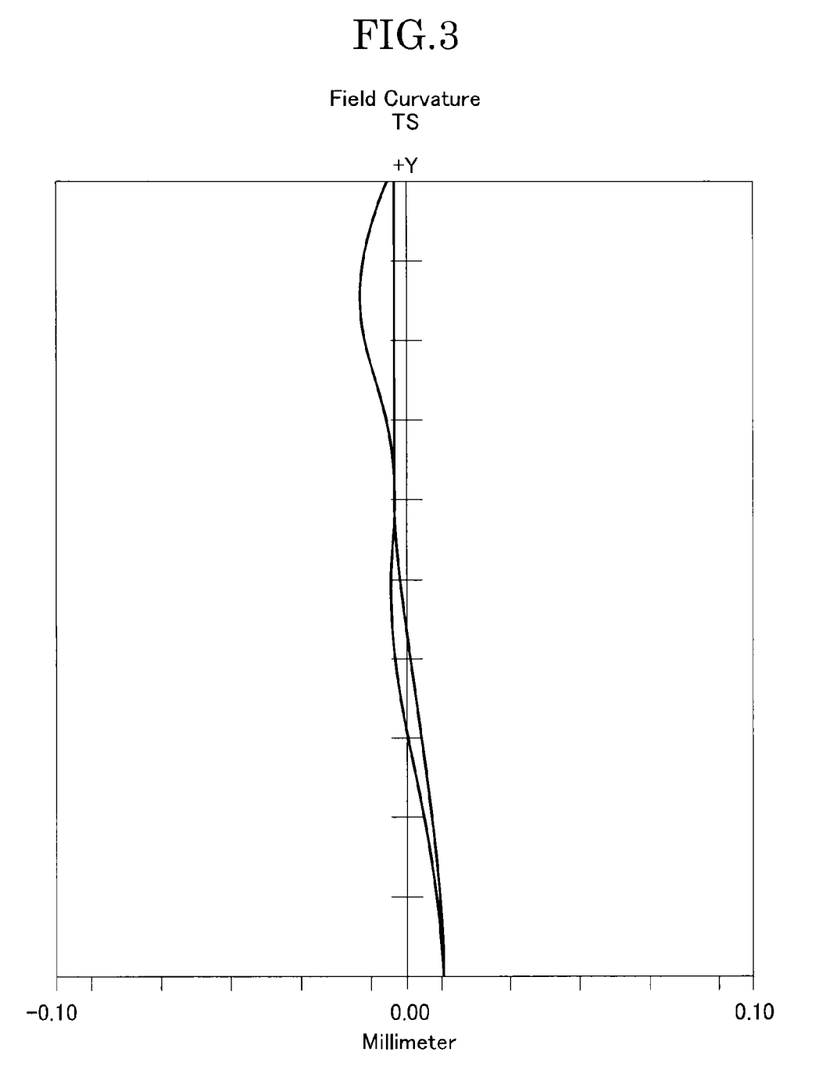
FIG. 3 is a view illustrating filed curvature of Example.

FIG. 2 illustrates the spherical aberration of the wide-angle lens of this example. FIG. 3 illustrates the field curvature of the wide-angle lens of this example.

Figure 4:
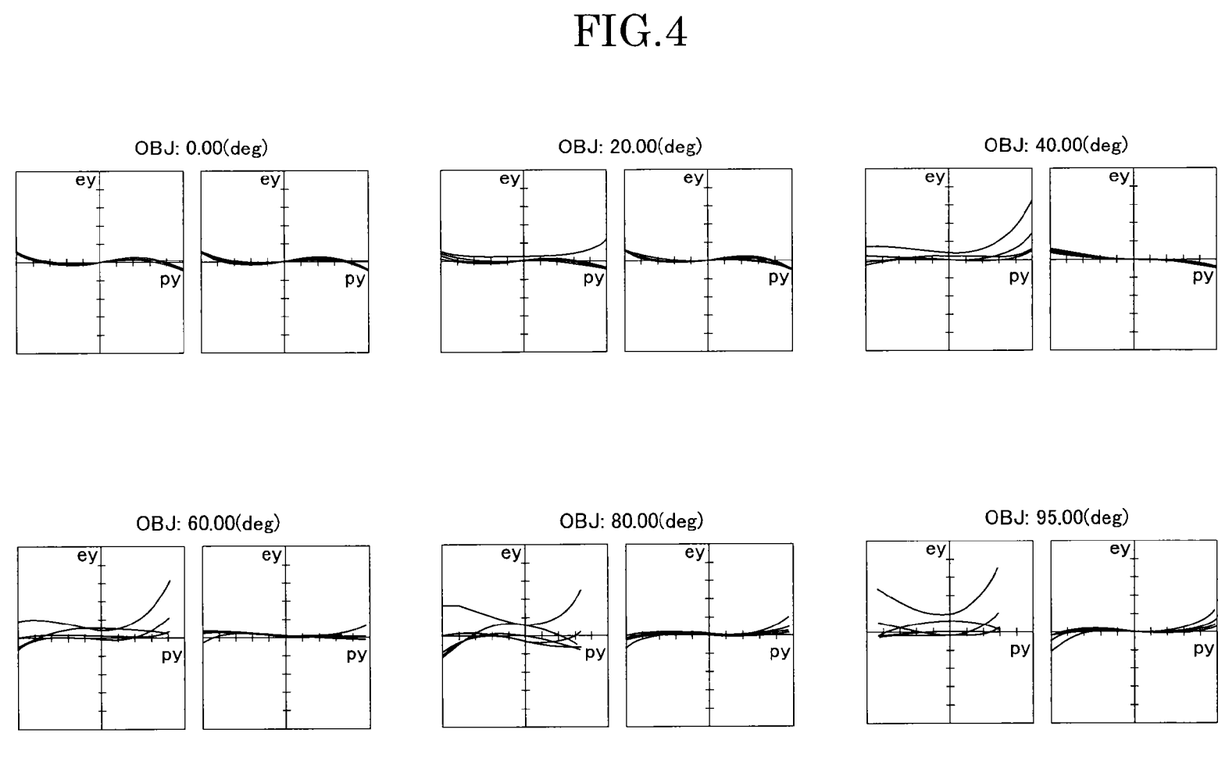
FIG. 4 is a view illustrating coma aberration of Example.

FIG. 4 illustrates the coma aberration of the wide-angle lens of this example.

Figure 5:
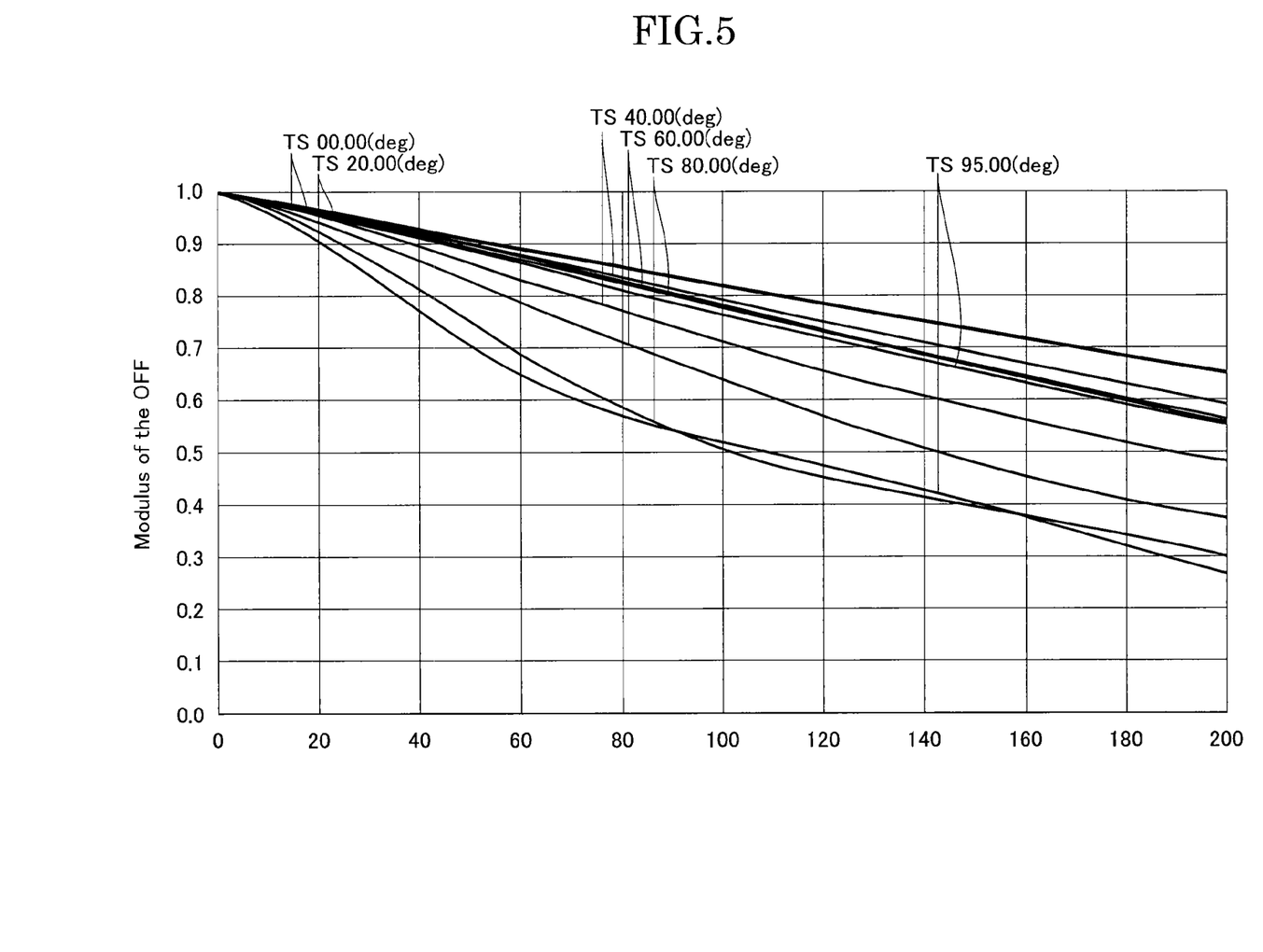
FIG. 5 is a view illustrating an OTF feature of Example.
Figure 6:
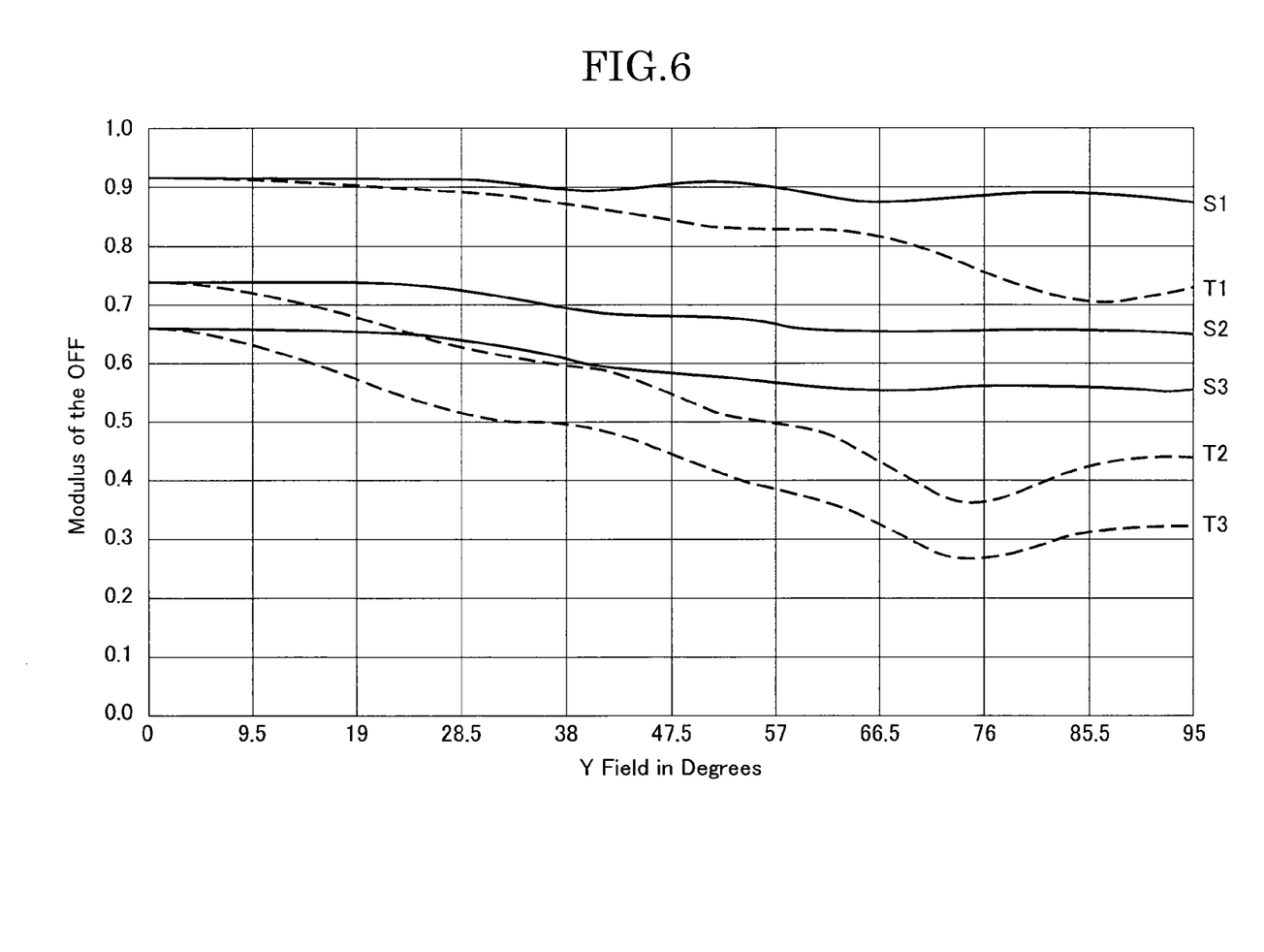
FIG. 6 is a view illustrating an OTF feature of Example.

FIGS. 5, 6, are views each illustrating an OTF feature. The horizontal axis illustrates a spatial frequency in FIG. 5 and a half field angle with degree in FIG. 6.

As is apparent from these figures, the performance of the wide-angle lens of this example is extremely high.

An imaging device to which the imaging device according the present invention is applied includes an imaging device which photographs a panoramic image. In particular, this panoramic image is suitable for an image of horizontal 360-degree, an image of 360-degree attached to a sphere body, namely, an omnidirectionaly photographed image, or the like.

Such an imaging device which photographs a panoramic image may be referred to as an omnidirectional imaging device or an entire celestial sphere type imaging device. An image photographed by the imaging device according the present invention can be a still image or a moving image.

Although the embodiment including the example of the present invention has been described above, the present invention is not limited thereto. It should be appreciated that variations may be made in the embodiment described by persons skilled in the art without departing from the scope of the present invention.

The invention claimed is:

1. A lens, comprising:
   a front group, and
   a rear group,
   wherein:
   a reflection surface from the front group includes a negative refractive power arranged on an object side toward the rear group which includes a positive refractive power arranged on the image side, the reflection surface curving an optical axis,
   a front principle point is set between a second lens and a third lens from the object side in the front group, and
   a focal length of an entire system f and a distance between an intersection of the reflection surface and the optical axis of the front group and the front principle point d satisfy the following condition:

$$7.0<d/f<9.0.$$

2. The lens according to claim 1, wherein:
   a distance from a most object side surface of the front group to the reflection surface DA, and a distance from the reflection surface to a most image side surface of the rear group DB satisfy the following condition:

$$DA<DB.$$

3. The lens according to claim 2, wherein:
   the reflection surface between the front group and the rear group is an inclined surface of a right angle prism, and is to internal-reflect a light beam from the front group toward the rear group, and
   a reflective index relative to a d-line of a material of the right angle prism nd satisfies the following condition:

$$nd \geq 1.8.$$

4. The lens according to claim 1, wherein:
   the reflection surface between the front group and the rear group is an inclined surface of a right angle prism, and is to internal-reflect a light beam from the front group toward the rear group, and
   a reflective index relative to a d-line of a material of the right angle prism nd satisfies the following condition:

$$nd \geq 1.8.$$

5. The lens according to claim 1, wherein:
   the front group includes three lenses.

6. The lens according to claim 5, wherein:
   the rear group includes four lenses.

7. The lens according to claim 6, further comprising:
   a field angle wider than 180 degrees.

8. The lens according to claim 1, wherein:
the front group consists of three lenses.
9. The lens according to claim 8, wherein:
the rear group consists of four lenses.
10. The lens according to claim 1, wherein:
the rear group includes four lenses.
11. The lens according to claim 1, wherein:
the rear group consists of four lenses.
12. The lens according to claim 1, further comprising:
a field angle wider than 180 degrees.
13. The lens according to claim 1, wherein:
the reflection surface is curving the optical axis by internal reflection.

* * * * *